Dec. 8, 1925.
R. P. BROWN
1,564,933
TEMPERATURE COMPENSATED ELECTRICAL MEASURING INSTRUMENT
Filed Feb. 20, 1922
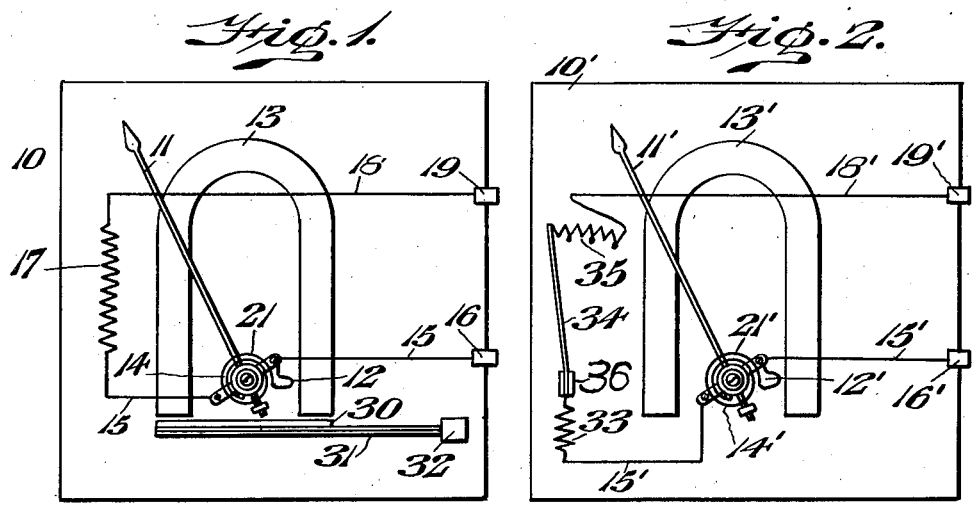
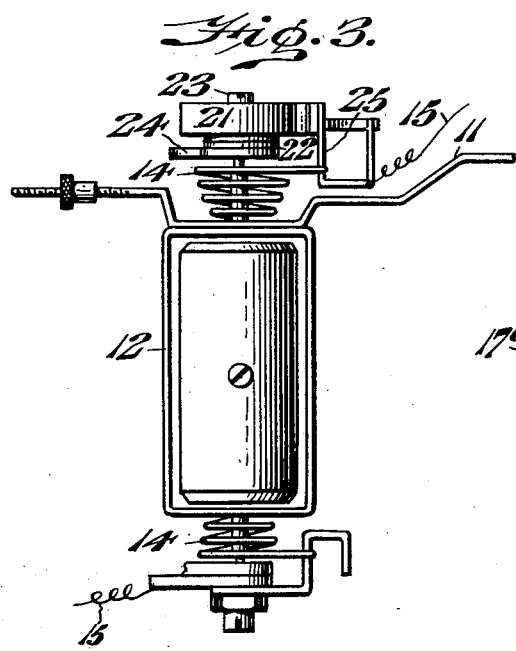
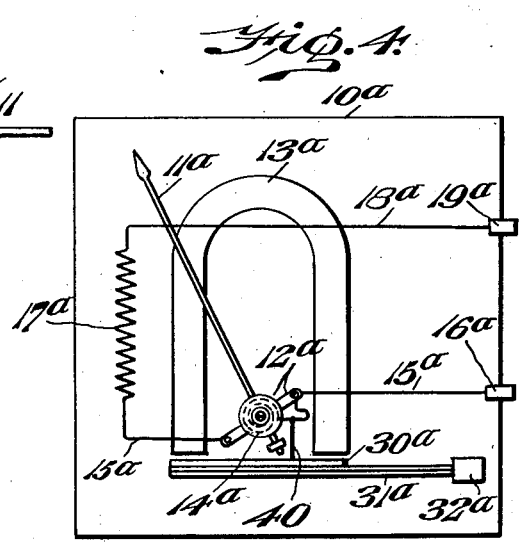
INVENTOR
Richard P. Brown.
BY
Robert M. Barr
ATTORNEY Patented Dec. 8, 1925.

1,564,933

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

TEMPERATURE-COMPENSATED ELECTRICAL MEASURING INSTRUMENT.

Application filed February 20, 1922. Serial No. 538,113.

*To all whom it may concern:*

Be it known that I, RICHARD P. BROWN, a citizen of the United States, and a resident of Philadelphia, county of Philadelphia, State of Pennsylvania, have invented certain new and useful Improvements in Temperature-Compensated Electrical Measuring Instruments, of which the following is a specification.

The general object of the present invention is to provide an electric meter with improved temperature compensating means. More specifically, the object of the invention is to provide an electric meter employed in conjunction with a thermocouple to measure temperatures with automatic means for relatively adjusting the meter pointer and scale to compensate for changes in the thermo-couple cold junction temperature and to provide the meter with separate thermostatically actuated means for adjusting the instrument meter constant as by changing the meter resistance or the character of the meter magnetic circuit to compensate for changes due to variations in meter temperature in the extent of pointer movement along the meter scale created by impressing a given electro-motive force on the meter winding.

In the accompanying drawings, Fig. 1 represents diagrammatically one form of temperature compensating means embodying the present invention as applied to an electrical measuring instrument; Fig. 2 similarly represents another form of the invention; Fig. 3 represents a detail in side elevation of the sensitive element of a measuring instrument showing an arrangement of one form of the invention; and Fig. 4 is a diagrammatic representation of an electrical instrument provided with still another form of the instrument.

Referring to Figs. 1 and 3 of the drawings, one form of the present invention is shown as applied to compensate an electrical meter or instrument 10 for temperature changes which otherwise would cause an incorrect temperature to be indicated or recorded by the instrument, as the case may be. The instrument 10, here shown by way of example, is of the type having an index or pointer 11 mounted to be controlled by the movements of a current sensative element 12 which is arranged to oscillate between the poles of a permanent magnet 13 and is controlled by light coiled springs 14, all of which is well understood in the art. The element 12 and springs 14 are in series with a conductor 15 leading from a terminal or binding post 16 to a resistor 17 and thence by a conductor 18 to a second terminal or binding post 19. The two terminals 16 and 19 serve to connect the instrument to the circuit the current of which is to be measured, and this circuit more often than otherwise includes a thermo-couple having its cold junction transferred to the terminals 16 and 19. Thus automatic compensation of the instrument 10 for temperature surrounding the instrument compensates for changes in the cold junction temperature of the thermocouple connected to the instrument.

For the purpose of automatically compensating the instrument 10 for changes of temperature in the surrounding atmosphere, a spiral member 21 of the Breguet type, but formed of two differently expanding metals, is mounted in coaxial relation with the sensitive element 12, one end of said spiral member 21 being fixed to a disc 22 which is normally held rigid by a staff 23 threaded through a fixed bar 24 and serves as an adjustable holder for the bearing of the sensitive element 12. The free end of the spiral member 21 is made fast to the outer end of the upper coil spring 14 by a strip 25. The member 21 is thus arranged to directly control the sensitive element 12 mechanically because, being of themostatic metal, a change of temperature will cause the spiral 21 to either expand or contract depending upon whether there is a rise or fall of temperature. Hence, any change of temperature of the cold junction of the thermocouple connected to the instrument causes the spiral 21 to function and as a result the pointer 11, with no current in the instrument, is maintained normally pointing to the correct degree mark for the cold junction temperature.

In order to compensate the instrument 10 for variations of resistance due to changes of temperature at the instrument, that is, compensating for the temperature coefficient of the instrument throughout its range, one form of the present invention consists in automatically varying the field of the magnet 13 by providing a soft iron strip 30 arranged across and in close proximity to the poles of the magnet 13 by mounting it rigidly upon a bimetallic thermostatic arm 31 having one end rigidly held by a bracket 32 while its opposite end is free to move under temperature changes. The arrangement is such that upon an increase of temperature within the instrument 10, the thermostatic arm 31 will move the soft iron strip 30 closer to the magnet poles and thereby decrease the reluctance of the magnetic circuit, while upon a decrease of temperature, the thermostatic arm 31 will move the soft iron strip 30 away from the magnet poles to increase the reluctance of the magnetic circuit. In this way the reluctance will be automatically varied in accordance with changes in temperature at the instrument so that variations in the resistance due to such changes will be automatically compensated and correct readings indicated by the pointer 11.

In the form of the invention shown in Fig. 2, the means for mechanically compensating the instrument for changes of temperature surrounding the instrument are the same as described in Fig. 1, and therefore the same parts will be identified by the same reference numerals with a prime exponent, thus instrument 10', pointer 11', etc. This automatic compensating means is combined with and functions in connection with means for compensating for the temperature coefficient of the instrument.

For carrying out this latter function the sensitive element 12' is in series with the conductor 15' which is in a circuit having binding post 16' as one terminal and including a fixed or constant resistor 33, a movable arm 34, a variable resistance in the form of a rheostat 35, a conductor 18', and binding post 19' forming the other terminal of the circuit. The arm 34 is formed of thermostatic metal, that is, two metals having different coefficients of expansion, and is fixed at one end to a bracket 36 while the other end is free to move under expansion or contraction and serves as the resistance controller of the rheostat 35. Upon a rise in the temperature surrounding the instrument, the thermostatic arm 34 is influenced to move in the direction necessary to cut out resistance from the rheostat 35, while a fall in temperature has the opposite effect. The parts are so arranged and proportioned as to vary the resistance of the rheostat 35 by an amount equal to the change of resistance due to the variation of the temperature, and consequently the net result is an accurate compensation of the instrument for the temperature variation, so that the reading of the instrument is true for the quantity measured. Thus, the instrument 10' is provided with compensation means cooperatively acting upon the instrument pointer 11' to correct a reading for the temperature coefficient of the instrument and for changes in temperature surrounding the instrument.

In the form of the invention of Fig. 4, an electrical measuring instrument of the type heretofore described is shown and such parts as are common to the other figures of the drawings are identified by numerals having letter exponents, as instrument 10$^a$, pointer 11$^a$, etc.

In this form of the invention compensation of a measuring instrument for changes in temperature surrounding the instrument and also for the temperature coefficient of the instrument are both accomplished by the movements of a single thermostat in the form of a bimetallic member 31$^a$ fixed at one end in a bracket 32$^a$ and having its other end free to move towards and away from the poles of the permanent magnet 13$^a$. This free end carries a soft iron strip 30$^a$ extending transversely of and in close proximity to the magnet poles so that movement of the thermostatic member 31$^a$ towards or away from the said magnet poles will vary the reluctance of the magnetic field so that, with current passing through the sensitive element 12$^a$, the position of the pointer 11$^a$ will be changed to correct for the variation in temperature.

For directly compensating the pointer 11$^a$ for changes in temperature surrounding the instrument, the thermostatic member 31$^a$ is provided with a rigid connection 40 to the outer end convolution of the upper coil spring 14$^a$, so that any movement of the member 31$^a$ will cause the coil spring 14$^a$ to act upon the sensitive element 12$^a$ in a manner to rotate it in a direction corresponding to whether a rise or fall in temperature has taken place. This rotation is transmitted to the pointer 11$^a$ which then moves in the direction necessary to compensate for the change in temperature and give a true reading of the temperature measured. For causing the correct amount of compensating movement the connection 40 is accurately positioned as to distance from the axis or bracket 32$^a$ for the member 31$^a$, and also has a length to allow the spring 14$^a$ to hold the pointer 11$^a$ in its calibrated normal zero position.

Having thus described my invention, I claim:

The combination with the winding, pointer and scale of an electric pyrometer, of thermostatically actuated means for relatively adjusting said pointer and scale in response to changes in the temperature surrounding the meter, and separate thermostatically actuated means for adjusting said meter to compensate for the tendency of variations in said temperature to vary the extent of movement of said pointer along said scale occurring when a given electromotive force is impressed on said winding.

Signed at Philadelphia, in the county of Philadelphia, and State of Pennsylvania, this 7 day of Feb., 1922.

RICHARD P. BROWN.